United States Patent
Furlong

(10) Patent No.: US 10,025,530 B2
(45) Date of Patent: Jul. 17, 2018

(54) OPTIMIZED GARBAGE COLLECTION FOR SOLID-STATE STORAGE DEVICES

(71) Applicant: HGST Netherlands B.V., Amsterdam (NL)

(72) Inventor: Jeffrey L. Furlong, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 14/500,952

(22) Filed: Sep. 29, 2014

(65) Prior Publication Data

US 2016/0092143 A1 Mar. 31, 2016

(51) Int. Cl.
G06F 3/06 (2006.01)

(52) U.S. Cl.
CPC ............ G06F 3/0652 (2013.01); G06F 3/061 (2013.01); G06F 3/065 (2013.01); G06F 3/0656 (2013.01); G06F 3/0679 (2013.01); G06F 3/0688 (2013.01)

(58) Field of Classification Search
CPC ...... G06F 3/0652; G06F 3/061; G06F 3/0656; G06F 3/0679
See application file for complete search history.

(56) References Cited

U.S. PATENT DOCUMENTS

| | | | |
|---|---|---|---|
| 8,463,983 B2 | 6/2013 | Eleftherlou et al. | |
| 8,479,080 B1 | 7/2013 | Shalvi et al. | |
| 8,566,511 B2 | 10/2013 | Tootoonchian et al. | |
| 8,612,719 B2 | 12/2013 | Givargis et al. | |
| 2010/0131697 A1* | 5/2010 | Alrod | G06F 11/1068 711/103 |
| 2012/0303873 A1 | 11/2012 | Nguyen et al. | |
| 2013/0132647 A1 | 5/2013 | Melik-Martirosian | |
| 2014/0115241 A1* | 4/2014 | Wei | G06F 12/0246 711/103 |
| 2015/0261461 A1* | 9/2015 | Li | G11C 16/06 711/135 |
| 2015/0350103 A1* | 12/2015 | Bertram | H04L 47/70 709/226 |

(Continued)

FOREIGN PATENT DOCUMENTS

| | | |
|---|---|---|
| CN | 102841850 | 12/2012 |
| WO | 2013028223 A1 | 2/2013 |

OTHER PUBLICATIONS

A. Jagmohan, M. Franceschini, L. Lastras; "Write Amplification Reduction in NAND Flash Through Multi-Write Coding," Mass Storage Systems and Technologies (MSST), 2010 IEEE 26th Symposium, vol. 1, No. 6, pp. 3-7, May 2010; http://ieeexplore.ieee.org/stamp/stamp.jsp?tp+&arnumber=5496985&isnumber=5496967.

(Continued)

*Primary Examiner* — Eric Cardwell
(74) *Attorney, Agent, or Firm* — McDermott Will & Emery LLP

(57) ABSTRACT

A method for managing a flash storage system includes reading a plurality of flash data units in the flash storage system, and identifying host data units having a first metadata tag from the host data units stored in the plurality of read flash data units. The method also includes buffering the identified host data units in a first transfer buffer, and writing the buffered host data units from the first transfer buffer to a first available flash data unit in the flash storage device.

17 Claims, 4 Drawing Sheets

(56) References Cited

U.S. PATENT DOCUMENTS

2016/0170873 A1* 6/2016 Uchigaito ........... G06F 12/0253
711/166

OTHER PUBLICATIONS

Hui Sun, Xiano Qin, Fei Wu, Changsheng Xie; "Measuring and Analyzing Write Amplification Characteristics of Solid State Disks," Modeling, Analysis & Simulation of Computer and Telecommunication Systems (MASCOTS), 2013 IEEE 21st International Symposium, vol. 212, No. 221, pp. 14-16, Aug. 2013; http://ieeexplore.ieee.org/stamp/stamp.jsp?tp=&arnumber=6730764&isnumber=6730734.

* cited by examiner

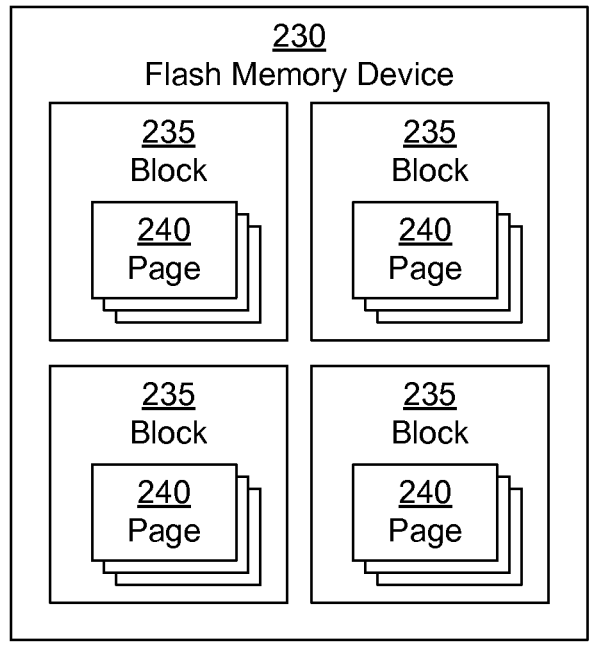
FIG. 2
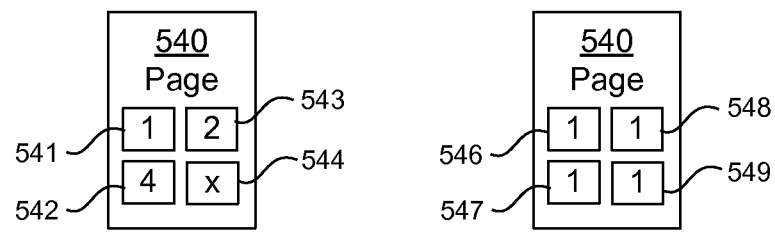
FIG. 3
FIG. 5A
FIG. 5B

OPTIMIZED GARBAGE COLLECTION FOR SOLID-STATE STORAGE DEVICES

BACKGROUND

The present disclosure concerns flash storage devices and, more particularly, optimized garbage collection processes for flash storage devices.

Solid-state storage devices (SSDs) may use flash memory as a non-volatile storage medium. Host data files may be written sequentially to flash memory. As portions of the host data files are updated over time, the host data files may become scattered across the flash memory. This scattering may be due to flash memory management techniques used to maximize the life of flash memory in view of limitations on the number of program/erase (P/E) cycles flash memory can withstand before becoming unusable. However, scattered host data files may require multiple read operations to read out a requested host data file from the flash memory thereby increasing latency in responding to read commands

SUMMARY

The subject technology optimizes garbage collection in a flash storage device by grouping host data units of a particular workload onto the same flash data unit. The host data units are associated with a workload by a metadata tag, appended to the host data units when written to the flash storage device.

According to aspects of the subject technology, a method for managing a flash storage system is provided. The method includes reading a plurality of flash data units in the flash storage system, each flash data unit storing one or more host data units. The method also includes identifying host data units having a first metadata tag from the host data units stored in the plurality of read flash data units. The method further includes buffering the identified host data units in a first transfer buffer, and writing the buffered host data units from the first transfer buffer to a first available flash data unit in the flash storage system.

According to other aspects of the subject technology, a flash storage system is provided. The flash storage system includes a flash memory device and a controller. The controller is configured to read a plurality of flash data units in the flash memory device, each flash data unit storing one or more host data units. The controller is also configured to identify host data units having a first metadata tag from the host data units stored in the plurality of read flash data units. The controller is also configured to buffer the identified host data units in a first transfer buffer, and write the buffered host data units from the first transfer buffer to a first available flash data unit in the flash memory device.

According to other aspects of the subject technology, a method for reading data from a flash storage system is provided. The method includes receiving, from a host, a read request for at least one host data unit associated with a first metadata tag, and reading a flash data unit in the flash storage system containing the at least one host data unit. The method also includes transferring the at least one host data unit to the host and buffering other host data units having the first metadata tag from the flash data unit into a first transfer buffer.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

FIG. 2 is a block diagram illustrating a flash memory device according to aspects of the subject technology.

FIG. 3 is a diagram illustrating a data sector according to aspects of the subject technology.

FIG. 5A is a depiction of a page having sectors with metadata tags according to aspects of the subject technology.

FIG. 5B is a depiction of a page optimized according to a metadata tag according to aspects of the subject technology.

DETAILED DESCRIPTION

Figure 1:
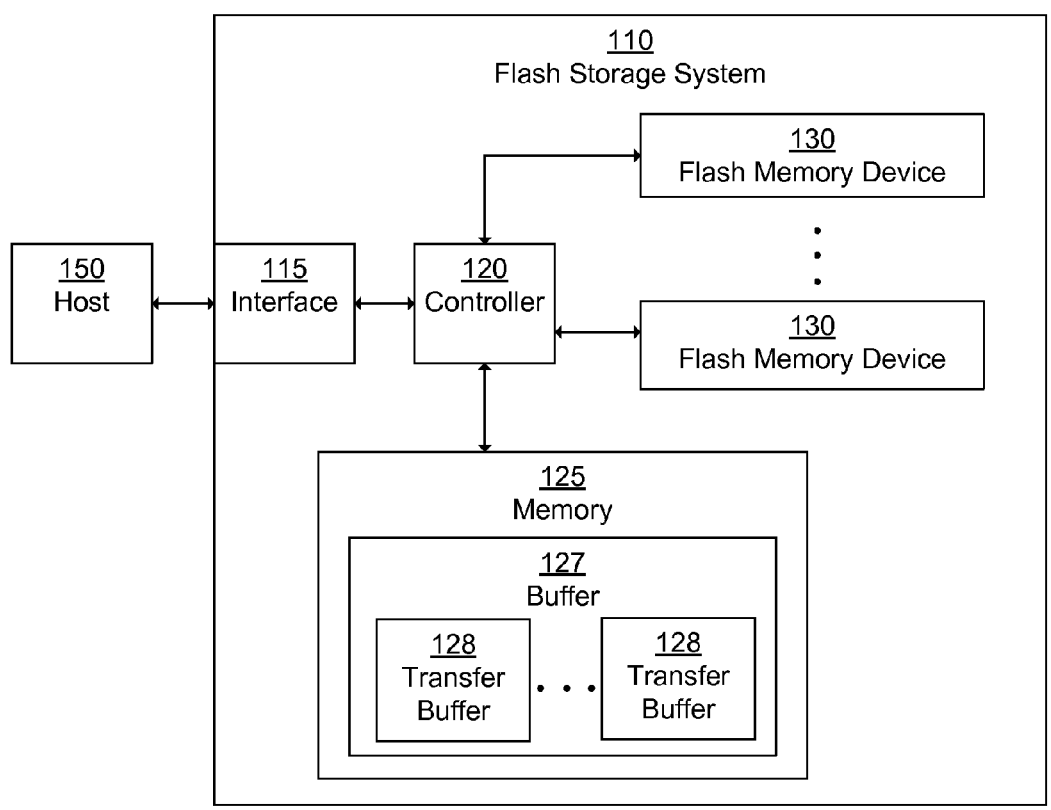
FIG. 1 is a block diagram illustrating components of a flash storage system according to aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology.

A solid-state storage device may include one or more flash memory devices, each of which comprises an array of flash memory cells. Each memory cell includes a floating gate transistor that is used to store one or more bits of data. The flash memory cells may be organized into physical blocks, with each physical block comprising a number of pages. Data is written to flash memory in write units of pages, where each page has the capacity to store a predetermined number of host data units or sectors. However, data is erased from flash memory in erase units of physical blocks.

Host system workloads may write data files to a flash storage device, update the data files, and read the data files back from the flash storage device. Data is written sequentially across available flash memory pages and blocks. Accordingly, updates and additions to a previously written data file are unlikely to be physically near the original data file in the flash memory. Data files may be further segmented and spread across the flash memory by maintenance operations such as garbage collection (GC), which is used to make physical blocks of flash memory available for writing data by erasing a physical block in the flash memory after moving any valid data remaining in the physical block to a new physical block. As data files are segmented and spread across the flash memory, the number of read operations needed for a workload to read back the data file may increase, adding undesirable latency to the operation of the flash storage device.

According to aspects of the subject technology, workloads of a host system that write and periodically update data files and frequently read back the data files in their entirety are identified. Such data files may include log files, system files, application files, etc. As the identified workloads write and update data files, the corresponding data written to flash memory is marked with metadata tags associated with the workloads. Maintenance operations, such as GC, may identify host data units or sectors having the metadata tags during the read portions of the maintenance operations and aggregate the host data units or sectors having common metadata tags for writing back during the write portions of the maintenance operations. In this manner, at least some of the initial physical proximity of the data files in the flash memory may be restored during the maintenance operations. These and other aspects of the subject technology are described in further detail below.

FIG. 1 is a block diagram illustrating components of a flash storage system 110 according to aspects of the subject technology. As depicted in FIG. 1, the flash storage system 110 includes an interface 115, a controller 120, flash memory devices 130, and a memory 125. The interface 115 facilitates communication of data, commands, and/or control signals between the flash storage system 110 and a host 150. The controller 120 controls the operation of the flash storage system 110 to store and retrieve data in the flash memory devices 130 in accordance with commands received from the host 150. The memory 125, which may be a random access memory (RAM), provides temporary storage space, which may include a buffer 127, for the controller 120 to process commands and transfer data between the host 150 and the flash memory device 130. The operation of each of these components is described in more detail below.

The interface 115 provides physical and electrical connections between the host 150 and the flash storage system 110. The interface 115 is configured to facilitate communication of data, commands, and/or control signals between the host 150 and the flash storage system 110 via the physical and electrical connections. The connection and the communications with the interface 115 may be based on a standard interface such as Universal Serial Bus (USB), Small Computer System Interface (SCSI), Serial Advanced Technology Attachment (SATA), etc. Alternatively, the connection and/or communications may be based on a proprietary interface. Those skilled in the art will recognize that the subject technology is not limited to any particular type of interface.

The controller 120 manages the flow of data between the host 150 and the flash memory devices 130. The controller 120 is configured to receive commands and data from the host 150 via the interface 115. For example, the controller 120 may receive data and a write command from the host 150 to write the data in the flash memory devices 130. The controller 120 is further configured to send data to the host 150 via the interface 115. For example, the controller 120 may read data from the flash memory devices 130 and send the data to the host 150 in response to a read command. The controller 120 is further configured to manage data stored in the flash memory devices 130 and the memory 125 based on internal control algorithms or other types of commands that may be received from the host 150. For example, the controller 120 is configured to perform GC and other maintenance operations. Those skilled in the art will be familiar with other conventional operations performed by a controller in a flash storage device, which will not be described in detail herein.

The controller 120 may be implemented with a general purpose processor, micro-controller, digital signal processor (DSP), an application specific integrated circuit (ASIC), a field programmable gate array (FPGA) or other programmable logic device, discrete gate or transistor logic device, discrete hardware components, or any combination thereof designed and configured to perform the operations and functions described herein. The controller 120 may perform the operations and functions described herein by executing one or more sequences of instructions stored on a machine/computer readable medium. The machine/computer readable medium may be the flash memory devices 130, the memory 125, or other types of media from which the controller 120 can read instructions or code. For example, flash storage system 110 may include a read only memory (ROM), such as an EPROM or EEPROM, encoded with firmware/software comprising one or more sequences of instructions read and executed by the controller 120 during the operation of the flash storage system 110.

The flash memory devices 130 may each be a single flash memory chip or may represent groups of multiple flash memory chips. The flash memory devices 130 may be organized among multiple channels through which data is read from and written to the flash memory devices 130 by the controller 120, or coupled to a single channel. The flash memory devices 130 may be implemented using NAND flash.

The flash memory devices 130 comprise multiple memory cells divided into storage blocks. These storage blocks may be referred to as data blocks or memory blocks and are addressable by the controller 120 using a physical block address. Each of the storage blocks is further divided into multiple data segments or pages addressable by the controller 120 using a physical page address or offset from a physical block address of the storage block containing the referenced page. The pages may store sectors or other host data units. The storage blocks represent the units of data that are erased within the flash memory devices 130 in a single erase operation. The physical pages represent the units of data that are read from or written to the flash memory devices 130 in a single read or write operation. FIG. 2 shows a block diagram of a flash memory device 230. The flash memory device 230 includes storage blocks or blocks 235. Each block 235 is divided into pages 240. Those skilled in the art may recognize other terminology conventionally used to refer to these data units within a flash storage device.

The subject technology is not limited to any particular capacity of flash memory. For example, storage blocks may each comprise 32, 64, 128, or 512 pages. Additionally, pages may each comprise 512 bytes, 2 KB, 4 KB, or 32 KB. The sectors may each comprise 4 KB, or other sizes such that sectors may be the same size as a page, or there may be multiple sectors per page.

Returning to FIG. 1, the memory 125 represents a volatile memory coupled to and used by the controller 120 during operation of the flash storage system 110. The controller 120 may buffer commands and/or data in the memory 125. For example, the controller 120 may buffer data in the buffer 127. The buffer 127 may include transfer buffers, such as transfer buffers 128 and/or other buffers used by the controller 120. The controller 120 also may use the memory 125 to store address mapping tables used to convert logical data addresses used by the host 150 into virtual and/or physical addresses corresponding to portions of the flash memory devices 130. Other types of tables, data, status indicators, etc. used to manage flash storage devices also may be stored in the memory 125 by the controller 120. The memory 125 may be implemented using dynamic random access memory (DRAM), static random access memory (SRAM), or other types of volatile or non-volatile random access memory known to those skilled in the art without departing from the scope of the subject technology.

The host 150 may be a computing device, such as a computer/server, a smartphone, or any other electronic device that reads data from and writes data to the flash storage system 110. The host 150 may have an operating system or other software that issues read and write commands to the flash storage system 110. The flash storage system 110 may be integrated with the host 150 or may be external to the host 150. The flash storage system 110 may be wirelessly connected to the host 150, or may be physically connected to the host 150.

The host 150 may be configured to identify particular workloads and to associate the particular workloads with metadata tags. A workload may involve frequent reading but occasional writing of a file. For instance, a system log file may be read frequently in its entirety, but written to less frequently. In other words, a workload characterized as writing a file, updating the file at least once, and read back in its entirety often, may be identified as a particular workload. However, the sectors of the system log file may be scattered across several pages. Because data is read by page, reading the scattered sectors requires accessing each page. Consolidating the sectors of the system log file to physically proximate locations (e.g. common pages) reduces the number of pages to be accessed to read the entire system log file.

Workloads may be identified by certain characteristics. As in the system log file example above, a particular workload may involve reading back a file in its entirety a certain number of times over a period of time. Other particular workloads may involve a certain number of updates to a file over a period of time.

The host 150 may have applications or drivers that can identify and associate files with metadata tags corresponding to workloads. The workloads may be identified, for example, through self-learning, through user input, or based on a standardized or known workload list. For example, certain system files or log files may be pre-associated with metadata tags. The host 150 may be configured to monitor read and write frequencies for files to identify workloads. The host 150 may receive external indications of workloads, such as receiving workload data from a remote device, or through user selection. The host 150 may associate a unique metadata tag or flag to each workload. For instance, the host 150 may be configured to identify n workloads, such as n=8. Tags 0-7 may be used for the eight workloads, respectively. The eight workloads may be the first eight workloads identified by the host 150. Alternatively, the eight workloads may be eight workloads identified based on, for example, the highest read frequency over a period of time, the highest write frequency over a period of time, or a combination of read frequency and write frequency.

When a workload on the host 150 sends a write command for data to the flash storage system 110, the host 150 may recognize the workload is associated with one of the eight workloads. The host 150, using the applications or drivers, appends the metadata tag to the data to be written such that the flash storage system 110 receives pre-appended data. For example, the host 150 may append the metadata tag to each sector or to a header of a packet containing multiple sectors. Alternatively, the host 150 may instruct the flash storage system 110 to write the metadata tag with each sector of data. The metadata tag may be written in spare bytes of a NAND page for each sector of data, similar to how error correction code (ECC) bytes are written.

FIG. 3 shows a data unit 300 according to example aspects of the present disclosure. The data unit includes data 320, which may be a sector, such as 4 KB of data. The data unit 300 optionally includes a header 310, which may store various administrative or identifying bits. The data unit 300 includes an ECC 330. Similar to the ECC 330, a metadata tag 340 may be written in spare bytes. The metadata tag 340 may be, for example, a number stored in bits. For instance, if there are eight metadata tags (0-7), the metadata tag 340 may require 3 bits (e.g., to store binary values from 0-7). More metadata tags may require more storage space for the metadata tag 340. Fewer metadata tags may require less space, but allows fewer workloads to be flagged. The data units within the flash memory devices 130 of the flash storage system 110 may include metadata tags similar to the metadata tag 340, for example from previously appended data. In certain implementations, the metadata tag 340 may be omitted or left empty if the associated data 320 is not flagged.

Figure 4:
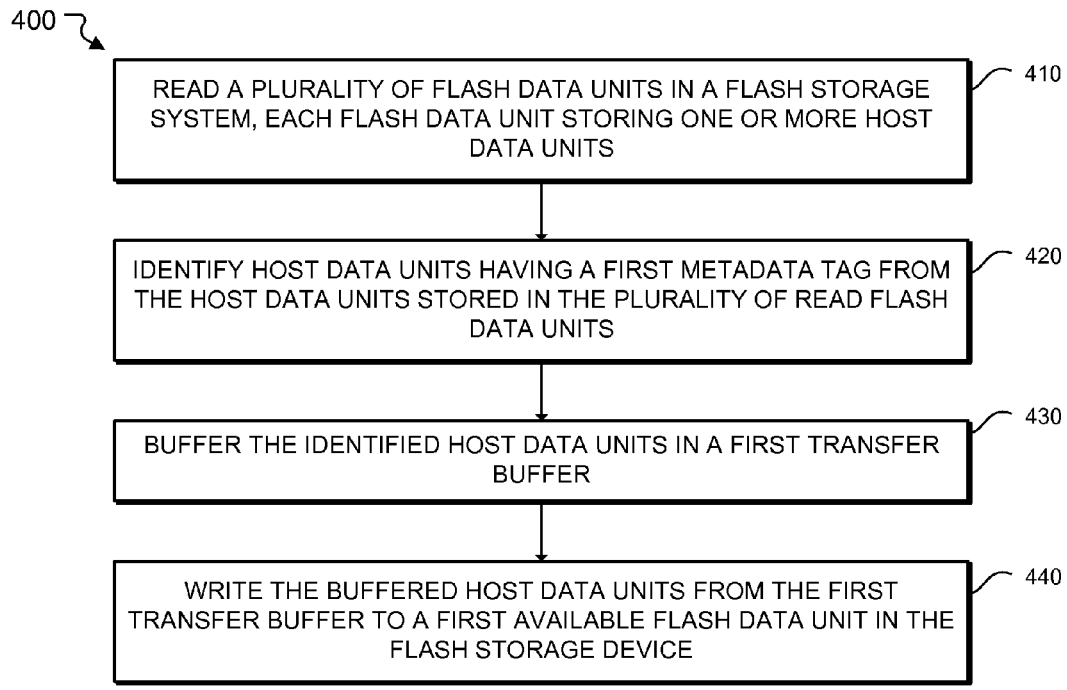
FIG. 4 is a flowchart illustrating a method for managing a flash storage system according to aspects of the subject technology.

When the flash storage system 110 enters a garbage collection mode or performs other maintenance operations that involve reading data and writing data to new locations, the flash storage system 110 may modify where data is written. The flash storage system 110 optimizes the physical locations of tagged sectors. The optimizing of physical locations of tagged sectors may require writing data to new locations. Performing the optimization during the GC operation takes advantage of the write operation required for GC. In addition, because GC or other maintenance operations are performed as background operations, this optimization is not performed during host read and write operations so as not to negatively affect performance of host read and write operations. FIG. 4 illustrates a flowchart 400 of one process of optimizing the locations of tagged data sectors according to example aspects of the present disclosure.

At block 410, a plurality of flash data units in a flash storage system is read. The flash data units may be read as part of a garbage collection operation or other maintenance operation. For example, the pages of a block may be read before erasing the block during GC. In other words, the process described herein may be integrated with the maintenance operation, to take advantage of the read and write operations required for the maintenance operation. Each flash data unit stores one or more host data units. The flash data unit may be a page, storing host data units or sectors, which may include valid and invalid host data. For example, FIG. 5A illustrates a page 540 having sectors, including sector 541, sector 542, sector 543, and sector 544. The sectors 541-544 may have different metadata tags, such as the sector 541 having metadata tag "1," the sector 543 having metadata tag "2," sector 542 having metadata tag "4," and sector 544 having "x" (or no tag) as seen in FIG. 5A.

At block 420, host data units having a first metadata tag are identified from the host data units stored in the plurality of read flash data units. At block 430, the identified host data units are buffered in a first transfer buffer. For example, all sectors having metadata tag "1" may be stored in the first transfer buffer, which may be one of the transfer buffers 128. A size of the transfer buffer 128 may correspond to a size of a flash data unit. In certain implementations, the other transfer buffers 128 may correspond to the other metadata tags.

At block 440, the buffered host data units are written from the first transfer buffer to a first available flash data unit in the flash storage device. The buffered host data units may be written to the first available flash data unit when the first transfer buffer is full. The buffered host data units may be written when the first transfer buffer reaches a threshold number of host data units, such as the maximum number of host data units the first available flash data unit has capacity to store. In other implementations, a number of host data units having the first metadata tag may be known or previously determined. The buffered host data units may be written to the first available flash data unit when the first transfer buffer stores the number of host data units having the first metadata tag. Alternatively, the buffered host data units may also be written after a predetermined period of time starting from the time the host data units were buffered. For instance, if the predetermined period of time has elapsed without filling the first transfer buffer, the buffered host data units may be written to the first available flash data unit, or the remaining space in the first transfer buffer may be filled with host data units without the first metadata tag. In other implementations, the first transfer buffer may be written to the first available flash data unit after a threshold number of flash data units have been examined.

The first available flash data unit may store only host data units having the corresponding metadata tag. For example, there may be enough host data units having the first metadata tag to fill the first available flash data unit. In certain implementations, the first available flash data unit may store other host data units without the metadata tag, for instance when not enough host data units are identified with the first metadata tag. FIG. 5B shows a page 540 having sectors, including sector 546, sector 547, sector 548, and sector 549 all having the same metadata tag "1." The page 540 may not exclusively store sectors having the metadata tag, for example, if there are fewer sectors having the metadata tag than the maximum or predetermined number of sectors for the page 540.

The optimization described above may reduce read overhead for a file of a workload associated with a metadata tag. For example, a 32 KB log file may be associated with the workload. When the host issues a read command to read the log file, the host may issue multiple read commands, such as eight read commands to read a sector (4 KB) each to read the 32 KB log file. Before optimization, the eight 4 KB sectors for the eight read commands may be stored in different NAND pages. The overhead may be, for example, 50 μs for each NAND page read, and 15 μs for transferring a sector. For eight read commands, the total overhead may be 520 μs. However, with the optimization, the requested sectors may be on one page, requiring 50 μs for the NAND page read, and 120 μs for transferring eight sectors, for a total overhead of 170 μs. By storing data of the same workload together, read overhead may be reduced. In addition, Write Amplification (WA) may be reduced, particularly if the existing data is not changing often. For example, the one page of tagged sectors may not change, reducing the need to run garbage collection on that one page.

Figure 6:
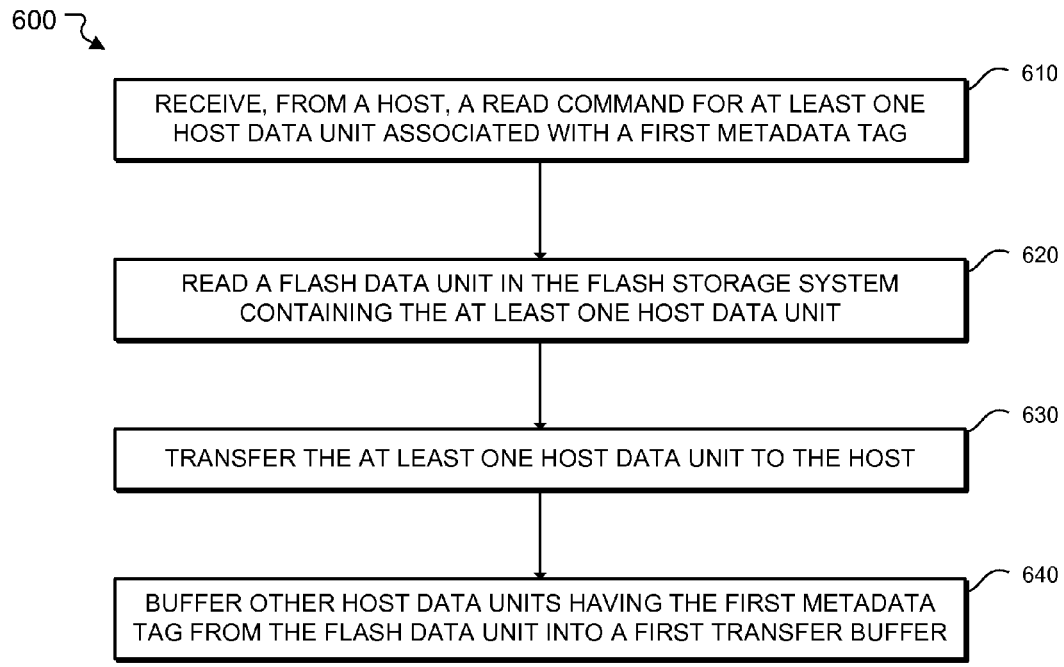
FIG. 6 is a flowchart illustrating a method for reading data from a flash storage system according to aspects of the subject technology.

FIG. 6 illustrates a flowchart 600 of one process for reading data from a flash storage system, such as the flash storage system 110, according to example aspects of the present disclosure. A host, such as the host 150, may issue a read command to the flash storage system for a file associated with a workload having a corresponding metadata tag. The flash storage system may have already been optimized in that similarly tagged sectors are stored in physical proximity. At block 610, a read command for at least one host data unit associated with a first metadata tag is received from a host. In certain implementations, the host may recognize that the read command is associated with a workload associated with the first metadata tag, and may issue a read command associated with the first metadata tag or may otherwise notify the flash storage system that the read command is associated with the first metadata tag. At block 620, a flash data unit in the flash storage system containing the at least one host data unit is read. The flash storage system may have been previously notified by the host that the read command is associated with the first metadata tag. In other implementations, the flash storage system may recognize the read command is associated with the first metadata tag by recognizing the first metadata tag when the flash storage system reads the flash data unit for the at least one host data unit. At block 630, the at least one host data unit is transferred to the host. The read command may be complete at block 630.

At block 640, other host data units having the first metadata tag from the flash data unit are buffered into a first transfer buffer, such as the transfer buffer 128. The buffered host data units may be transferred to the host individually in response to successive read commands. Alternatively, the buffered host data units may be transferred to the host as one operation. Buffering the other host data units from the flash data unit obviates the need to later buffer the other host data units, particularly if subsequent read commands for the other host data units are soon issued by the host.

When the host issues a read command for data associated with a metadata tag, a NAND page having the requested data is read. All the host data units from the identified NAND page may be buffered in a transfer buffer. In the 32 KB log file example above, the entire log file may be read. The host may initially request 4 KB with the first read command. Since this sector is the first sector of the log file, there is a high likelihood that the other sectors of the log file will be requested, particularly because the associated workload corresponds to reading the entire log file. The entire NAND page may be buffered in the transfer buffer, although sectors without the metadata tag may not be buffered. The buffered data can be kept in the buffer for a threshold time before being evicted. Alternatively, a counter can be incremented for each sector read by the host. When the counter equals the total number of sectors of the read command from the host, the buffered sectors may be evicted. In other implementations, the buffered sector data may have a valid flag, which stays valid until the host reads the sector data. When the data sector is invalid, it may be evicted.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for managing data in a flash storage system, comprising:
    reading a plurality of flash data units in the flash storage system, each flash data unit storing a plurality of host data units, at least some of the plurality of host data units being associated with a workload by a metadata tag, and the plurality of host data units having a plurality of dissimilar metadata tags;
    identifying host data units having a same first metadata tag from the plurality of host data units read from the plurality of read flash data units, wherein the first metadata tag is stored with each identified host data unit at a time of writing each identified host data unit to a respective flash data unit from which the identified host data unit was read;
    buffering the identified host data units in a first transfer buffer corresponding to the same first metadata tag; and
    writing the buffered host data units having the same first metadata tag from the first transfer buffer to a first available flash data unit in the flash storage system.

2. The method of claim 1, wherein the first available flash data unit is configured to store a predetermined number of host data units, and
    wherein the buffered host data units are written to the first available flash data unit when a number of host data units buffered in the first transfer buffer equals the predetermined number of host data units.

3. The method of claim 1, wherein the buffered host data units are written to the first available flash data unit after a predetermined period of time.

4. The method of claim 1, further comprising:
    identifying host data units having any one of the plurality of dissimilar metadata tags from the host data units read from the plurality of flash data units;
    buffering the identified host data units in a plurality of transfer buffers, wherein each of the plurality of transfer buffers corresponds respectively to each unique metadata tag of the plurality of dissimilar metadata tags of the identified host data units; and
    writing the buffered host data units from the plurality of transfer buffers to respective ones of a plurality of available flash data units.

5. The method of claim 4, wherein each of the plurality of available flash data units is configured to store a predetermined number of host data units, and
    wherein the buffered host data units in one of the plurality of transfer buffers are written to one of the plurality of available flash data units when a number of buffered host data units in the one of the plurality of transfer buffers equals the predetermined number of host data units.

6. The method of claim 4, wherein the buffered host data units in one of the plurality of transfer buffers is written to one of the plurality of available flash data units after a predetermined period of time since a first one of the buffered host data units was written to the one of the plurality of transfer buffers.

7. The method of claim 1, wherein the plurality of flash data units are part of a flash data block in the flash storage system, and wherein the reading step is responsive to starting a garbage collection operation on the flash data block.

8. The method of claim 1, wherein the first metadata tag corresponds to a workload from a host.

9. A flash storage system comprising:
    a flash memory device; and
    a controller configured to:
        read a plurality of flash data units in the flash memory device, each flash data unit storing a plurality of host data units, at least some of the plurality of host data units being associated with a workload by a metadata tag, and the plurality of host data units having a plurality of dissimilar metadata tags;
        identify host data units having a same first metadata tag from the plurality of host data units read from the plurality of read flash data units, wherein the first metadata tag is stored with each identified host data unit at a time of writing each identified host data unit to a respective flash data unit from which the identified host data was read;
buffer the identified host data units in a first transfer buffer corresponding to the same first metadata tag; and
write the buffered host data units having the same first metadata tag from the first transfer buffer to a first available flash data unit in the flash memory device.

10. The flash storage system of claim 9, wherein the first available flash data unit is configured to store a predetermined number of host data units, and
wherein the buffered host data units are written to the first available flash data unit when a number of buffered host data units equals the predetermined number of host data units.

11. The flash storage system of claim 9, wherein the buffered host data units are written to the first available flash data unit after a predetermined period of time.

12. The flash storage system of claim 9, further comprising:
identifying host data units having any one of the plurality of dissimilar metadata tags from the plurality of host data units read from the plurality of flash data units;
buffering the identified host data units in a plurality of transfer buffers, wherein each of the plurality of transfer buffers corresponds respectively to each unique metadata tag of the plurality of dissimilar metadata tags of the identified host data units; and
writing the buffered host data units from the plurality of transfer buffers to respective ones of a plurality of available flash data units.

13. The flash storage system of claim 12, wherein each of the plurality of available flash data units is configured to store a predetermined number of host data units, and
wherein the buffered host data units in one of the plurality of transfer buffers are written to one of the plurality of available flash data units when a number of buffered host data units in the one of the plurality of transfer buffers equals the predetermined number of host data units.

14. The flash storage system of claim 12, wherein the buffered data units in one of the plurality of transfer buffers is written to one of the plurality of available flash data units after a predetermined period of time since a first one of the buffered data units was written to the one of the plurality of transfer buffers.

15. The flash storage system of claim 9, wherein the plurality of flash data units are part of a flash data block in the flash storage system, and wherein reading, identifying, buffering, and writing steps are part of a garbage collection operation on the flash data block.

16. The flash storage system of claim 9, wherein the plurality of flash data units store valid host data units and invalid host data units, and wherein the identified host data units comprise the valid host data units having the first metadata tag and exclude the invalid host data units.

17. A method for reading data from a flash storage system, comprising:
receiving, from a host, a read command for at least one host data unit associated with a first metadata tag;
reading a flash data unit in the flash storage system containing the at least one host data unit, wherein the first metadata tag is stored with the at least one host data unit at a time of writing the at least one host data unit to the first flash data unit;
transferring the at least one host data unit to the host;
buffering other host data units having a same first metadata tag from the first flash data unit into a first transfer buffer corresponding to the first metadata tag;
incrementing a counter for each buffered host data unit transferred to the host; and
evicting the buffered host data units from the first transfer buffer when the counter equals a number of host data units associated with the read command.

* * * * *